(12) United States Patent
Fisher et al.

(10) Patent No.: US 8,694,309 B1
(45) Date of Patent: Apr. 8, 2014

(54) AUTOMATIC SPEECH RECOGNITION TUNING MANAGEMENT

(75) Inventors: Aaron Scott Fisher, Omaha, NE (US); Prashanta Pradhan, Omaha, NE (US)

(73) Assignee: West Corporation, Omaha, NE (US)

( * ) Notice: Subject to any disclaimer, the term of this patent is extended or adjusted under 35 U.S.C. 154(b) by 717 days.

(21) Appl. No.: 11/673,663

(22) Filed: Feb. 12, 2007

(51) Int. Cl.
*G10L 19/00* (2013.01)
(52) U.S. Cl.
USPC .......................... 704/216; 704/235; 704/270
(58) Field of Classification Search
USPC .............. 704/231, 235, 255, 270, 270.1, 251, 704/257, 1–10, 216, 237, 243, 244, 245
See application file for complete search history.

(56) References Cited

U.S. PATENT DOCUMENTS

| | | | |
|---|---|---|---|
| 6,263,308 B1 * | 7/2001 | Heckerman et al. .......... | 704/231 |
| 6,513,003 B1 * | 1/2003 | Angell et al. ................. | 704/235 |
| 6,980,953 B1 * | 12/2005 | Kanevsky et al. ............ | 704/235 |
| 7,103,542 B2 * | 9/2006 | Doyle ........................... | 704/231 |
| 7,236,931 B2 * | 6/2007 | He et al. ....................... | 704/235 |
| 7,260,530 B2 * | 8/2007 | Werner ......................... | 704/251 |
| 7,315,818 B2 * | 1/2008 | Stevens et al. ............... | 704/235 |
| 7,383,187 B2 * | 6/2008 | Damiba ........................ | 704/270 |
| 7,440,895 B1 * | 10/2008 | Miller et al. ................. | 704/244 |
| 7,555,431 B2 * | 6/2009 | Bennett ........................ | 704/255 |

* cited by examiner

*Primary Examiner* — Huyen X. Vo

(57) ABSTRACT

A method, a computer readable medium and a system for automatic speech recognition tuning management that comprises, collecting an utterance, analyzing the utterance, correlating the collected utterance to the utterance analysis, and fetching at least one of, the collected utterance, the utterance analysis, and the correlation of the collected utterance to the utterance analysis.

18 Claims, 9 Drawing Sheets

AUTOMATIC SPEECH RECOGNITION TUNING MANAGEMENT

CROSS REFERENCE TO RELATED APPLICATIONS

The present patent application is also related to commonly assigned U.S. patent application Ser. No. 11/673,665 entitled AUTOMATIC SPEECH RECOGNITION TAGGING, and U.S. patent application Ser. No. 11/673,667 entitled AUTOMATIC SPEECH RECOGNITION REPORTING, filed on even date herewith, the entire contents of each of which are incorporated by reference herein.

FIELD OF THE INVENTION

The embodiment of the disclosure is generally related to enabling an Automatic Speech Recognition (ASR) system to manage recording, translation and reporting of a multitude of spoken strings of words as a single meaning within a speech application and more specifically, to manage automatic speech recognition tuning.

Therefore, what is needed is an ability to manage recording, analysis and reporting of what has been transcribed and the interpretation grammar to allow tuning.

BACKGROUND OF THE INVENTION

Currently, the creation of a speech application requires significant effort from subject matter experts and grammar developers primarily related to the mapping of potential spoken strings of words (utterances) to specific meanings (semantics). This mapping is referred to as the Reporting process. The Reporting process requires review of all possible combinations of utterances and assignment to a specific semantic upon which a speech application can react. The sample size of potential utterances that must be tagged is large. A meaning report is the comparison of differences between files that have been transcribed and the interpretation grammar. This comparison allows tuning of the interpretation grammar to increase its accuracy.

Therefore, what is needed is manage recording, analysis and reporting of what has been transcribed and the interpretation grammar to allow tuning.

SUMMARY OF THE INVENTION

Web ASR Management Tool is a web interface that allows users to perform functions related to utterances capture, transcription and ASR reports. This tool allows users to manage the transcription jobs, transcribe ASR utterances, and view ASR reports. It can be used by transcribers, managers and analysts wanting to collect and analyze the data as well as the user wanting to record the utterances and to listen to those utterances.

A super user creates the job using the Web ASR Manager. The Web ASR Manager interacts with a database and provides job information to the database to record calls. When the Voice eXtensible Markup Language (VXML), Class and Speech Application Language Tags (SALT) systems receive calls from a caller located on an outside network, those servers interact with the database and query "Do I log this call?" if the response is yes then the logs are created in the system.

A user ID and a password are set to provide secure access to the tool. The user group level is defined by application. For example, the super user has the capability to view jobs, reports and is also able to transcribe. Transcribers are able to transcribe and do not have access to the jobs and reports. A transcription supervisor has access to view the reports as well as the ability to transcribe, but cannot view and set up jobs.

After the user enters the proper login information, the starting page is presented according to his login credential. Brief directions are also provided on using that portion of the tool.

The tool interacts with the transcription, utterance capture, fetcher and reporting functions.

The transcription component covers job setup, transcriber activities and database hits. The transcription process starts with the job set up to capture the utterance.

The super user, has the privilege to create a transcription job. Job creation requires the super user to log in to the Web ASR Manager Tool. Web ASR interacts with the database. The database also interacts with the VXML and Class type servers. VXML type data is typically handled by OSR (OpenSpeech™ Recognizer) whereas class type data is handled by ASR. When VXML and Class servers receive a call from an outside network they interact with the database, request permission to log the call, and save the utterances. The database allows the server to log the file and utterances to the OSR or ASR server. The logged file and the utterances are available for transcription as well as for tuning and analysis purposes.

Once recording starts, users can start transcribing using the transcription page. Transcribers are responsible for transcribing the utterances. Transcribers can log into the web interface as well as the phone. Transcribers log into the web interface and dial in the number using their phone and enter the key to start transcribing. Using the phone system they can listen to the utterances and start their input using the interface. Web ASR and the phone system interact with the transcription server. The transcription server interacts with database and fetcher. The fetcher collects data from ASR/OSR. The transcription server requests the data from database. The fetcher makes recordings and related data available to the transcriber through the web interface and the phone system.

There are two types of filters available to create the transcription jobs an easy filter and a defined filter.

The easy filter requires the user to provide information such as client, application, job name, job priority, start date and time, stop date and time, max calls, due date and time, grammar, state and job brief description.

A defined filter allows the user to create a filter that has options from both the simple defined filter and the advanced defined filter.

A simple defined filter turns the data collection capability on and off. This filter has the capability to collect a set of data for the assigned days of the week as well as the assigned number of calls per day. This gives the flexibility to customize collection activities. If a new filter is chose additional options are allowed.

The advanced defined filter customizes the data collection to collect the maximum number of calls per hour, the days to collect the data, time to collect data, and which data to collect. Automatic Number Identification (ANI) and Internet Protocol (IP) addresses can be used to filter the data collection.

There are three ways to capture the utterance capture by VXML, class and SALT.

The fetcher is utilized in conjunction with utterance storage servers, interacts with ASR/OSR and collects the required data.

The fetcher retrieves logs and utterances from the server on per call basic directory structure according to the time and day those calls were recorded. Log files and utterance files are used for tuning and analysis as well as the transcription process.

There are various types of reports that can be generated using the data and the logs collected, a meaning report and a transcription report.

The meaning report is used by analysts for tuning transcription. The meaning report is the comparison between what has been transcribed and its grammar definition. The transcriber listens to the utterance and transcribes it. The transcribed text is processed through the grammar and outputs the meaning report.

The results are categorized in the following way:
CA-IG (Correct accept—in grammar)
FA-IG (False accept—in grammar)
FR-IG (False reject—in grammar)
CR-OOG (Correct reject—out of grammar)
FA-OOG (False accept—out of grammar)
CR-OOC (Correct reject—out of coverage)
FA-OOC (False accept—out of coverage)

There are three types of transcription reports that can be generated using the Web ASR Manager tool, application, server and transcriber.

To use the application report the user provides client name, application name, start date and time, stop date and time, and the report type to generate the report. The type of reports that can be generated for the application are state report, total call report, latency report, error report and meaning out of grammar report.

The agent report is generated to supervise the transcribers. The reports generated using this tool are transcriber time card report, transcriber efficiency report, transcriptionist monitor report, who's doing what report and the task priority report.

The transcriber efficiency report is used to count the number of utterances transcribed on a particular date, hours worked on that day and speed in transcription per hour. It also generates the grand total for each item on that date. The report has the capability to see the internal as well as external transcribers and their total report respectively. It has the capability to determine the transcriptions each transcriber has done and listen to the transcriptions.

Who's doing what agent report provides the name of the transcriber, client and application being working on, the transcription count for each transcriber and the login count. The report outputs the call Id, call order and the utterance if there is any.

The task priority report lists the priority for each job created as well as the job ID, client name, application name, job name and the description.

The tagging tool categorizes the call. Allowing targeting of a particular group of calls for problem resolution.

The call pathing tool emphasizes different nodes that the call is going to follow to determine the course the call is following to determine which nodes got the most hits and where the call ended up.

The transcription dictionary and spelling correction feature provides a check for spelling when the user is transcribing and provides various options for correct transcription. Some of the features for transcription page are accent determination of the user, location determination of the transcription, background noise elimination, identification of the type of phone line use, such as cell phone, caller gender determination, caller maturity determination, the number of total utterances, the number of transcribed utterances and number remaining and the number of utterances by grammar.

The report shows which utterances were transcribed by which transcriber. The report gives a textual representation of the prompt the caller responded to. The report allows instant messaging, secondary ASR for allowing the tool to be utilized by voice command, call regeneration and confidence level of the grammar. The Web ASR manager has the capability to rewind or fast forward the record while transcribing and the capability to revisit the previous record while transcribing.

The Web ASR Manager Tool is a complete tool to set up jobs, to get the reports as well as transcribe the collected utterances. The collected data is used by transcribers, analysts, managers for transcription, tuning, analysis, reporting and to make valuable decisions and process improvements. Secure login provides the users the opportunity to work on their own workspace and secure access to the data using the tool.

An embodiment of the disclosure provides a computer system that facilitates comparison reporting between a translation and the interpretation grammar supporting a speech application. The success of a speech application is tied to a system's ability to understand a large list of transcribed utterances or sentences. A system must apply a complex set of rules referred to as Interpretation Grammar. This grammar is based on a corpus which is tagged (a corpus is a collection of recorded utterances used for linguistic analysis). Therefore, before the grammar can be developed each line in the corpus must be tagged. The Reporting process is performed by a subject matter expert (SME) who indicates the specific meaning of a sentence.

In one embodiment of the disclosure, a method for automatic speech recognition tuning management that comprises, collecting an utterance, analyzing the utterance, correlating the collected utterance to the utterance analysis, and fetching at least one of, the collected utterance, the utterance analysis, and the correlation of the collected utterance to the utterance analysis.

In another embodiment of the disclosure, a computer readable medium that comprises instructions for, receiving an utterance, receiving a transcription of the utterance, receiving a translation of the utterance, relating the received utterance to at least one of, the utterance transcription, and the utterance translation, and fetching at least one of, the received utterance, the utterance transcription, the utterance translation, and the relation.

In yet a further embodiment of the disclosure, a system for automatic speech recognition tuning management that comprises, a memory, and a processor communicably coupled to the memory, wherein the processor, receives a transcription of an utterance, receives a translation of the utterance, correlates the transcription to the translation, and reports a metric pertaining to the transcription of the utterance and the translation of the utterance.

DETAILED DESCRIPTION OF THE INVENTION

Figure 1:
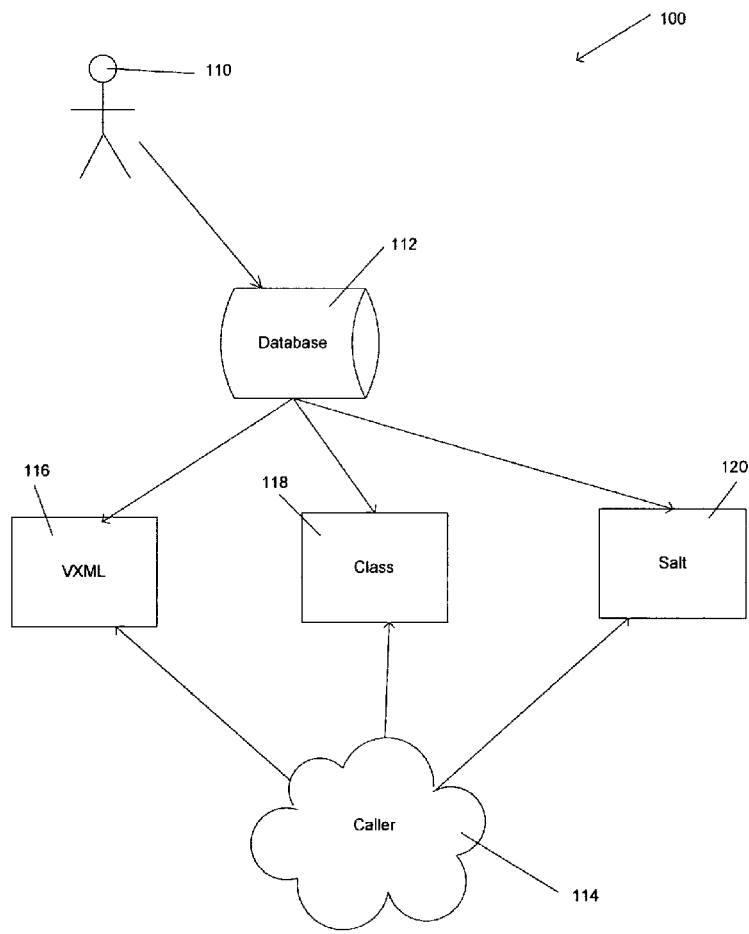
FIG. 1 represents a process overview of automatic speech recognition tuning management in accordance with an embodiment of the disclosure.

Referring now to FIG. 1, a process overview of automatic speech recognition tuning management 100 is depicted. A super-user 110 creates a transcription job using an embodiment of the present disclosure, which interacts with a database 112. If it is decided to log a telephone call 114, automatic speech recognition, also referred to as translation, is performed and output in voice extended markup language 116, class 118, or speech application language tags 120 and is stored by the database. The transfer of information occurs via at least one of: a wireless protocol, a wired protocol and a combination of the wireless protocol and the wired protocol.

Figure 2:
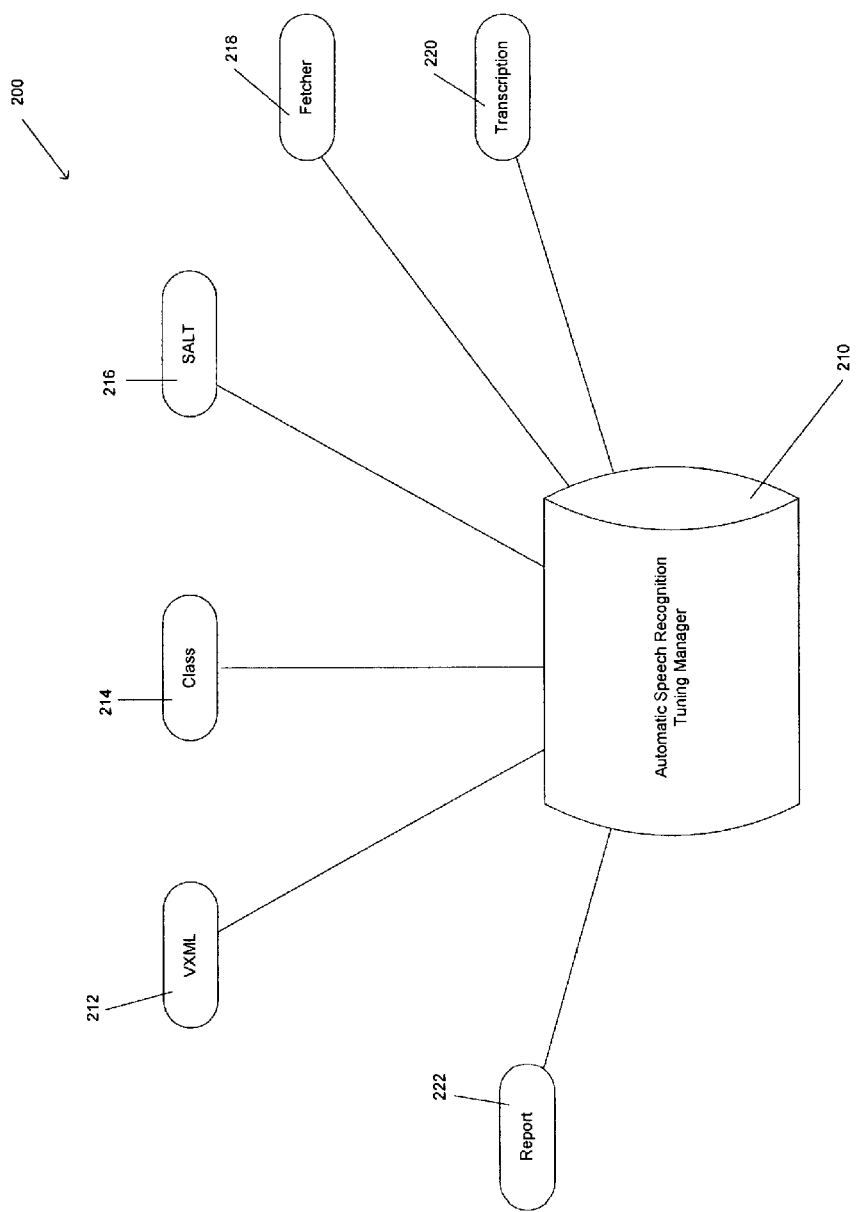
FIG. 2 represents an overview of tool activity management in accordance with an embodiment of the disclosure.

Referring now to FIG. 2, an overview of tool activity management 200 is depicted. An automatic speech recognition tuning manager 210 receives translations of utterances, from a processor performing natural or automatic speech recognition, the data is received in VXML 212, Class 214 and SALT 216 formats. A fetcher 218 places the data in a database and retrieves the translation and utterance from the database. A transcription 220 performed by an transcriber referred to as a transcriptionist is aligned to the translation and utterance and reports 222 are generated with respect to the transcription and translation. The transfer of information occurs via at least one of: a wireless protocol, a wired protocol and a combination of the wireless protocol and the wired protocol.

Figure 3:
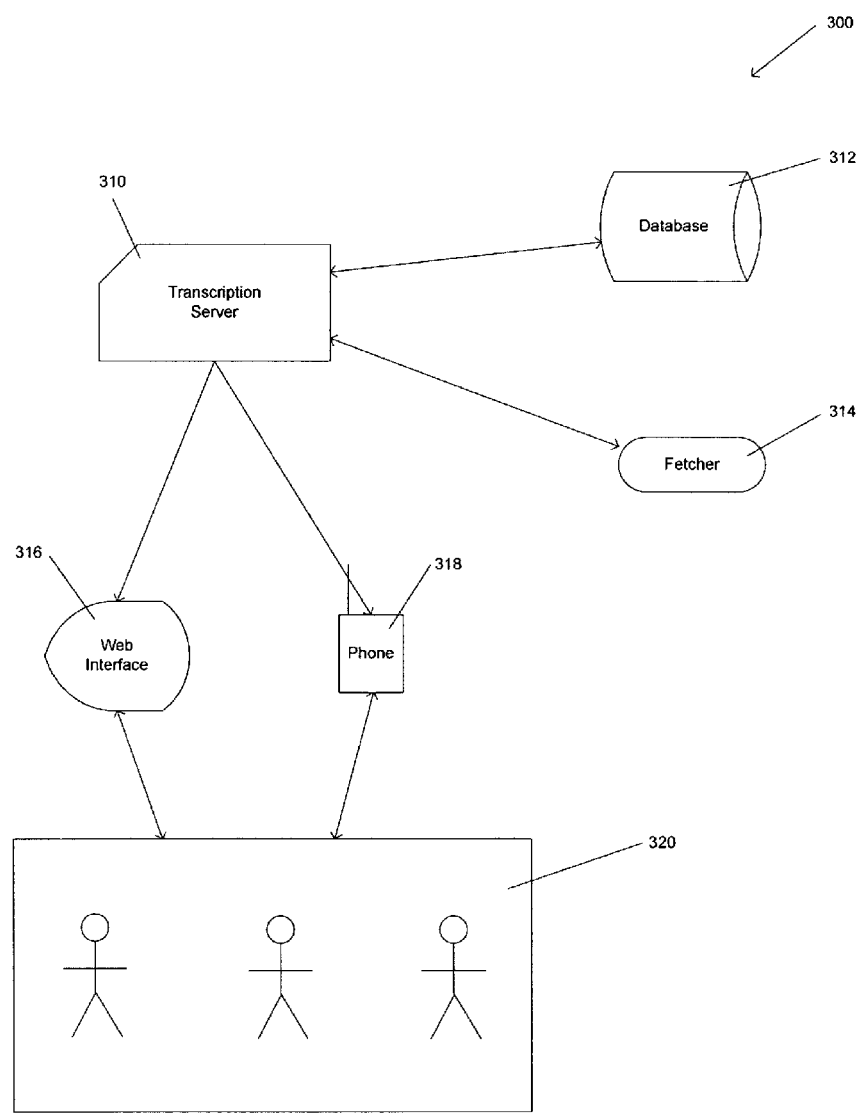
FIG. 3 represents an overview of transcription activity management in accordance with an embodiment of the disclosure.

Referring now to FIG. 3, an overview of transcription activity management 300 is depicted. A transcription server 310 communicates with the database 312 utilizing the fetcher 314 to store and retrieve utterances, translations performed by natural or automatic speech recognition on a processor and transcriptions. The translation is displayed on a web interface 316 and the utterance audibly sent to a telephone 318 for use by a transcriptionist 320. Multiple transcriptionists may work on the transcription simultaneously as shown. The transfer of information occurs via at least one of: a wireless protocol, a wired protocol and a combination of the wireless protocol and the wired protocol.

Figure 4:
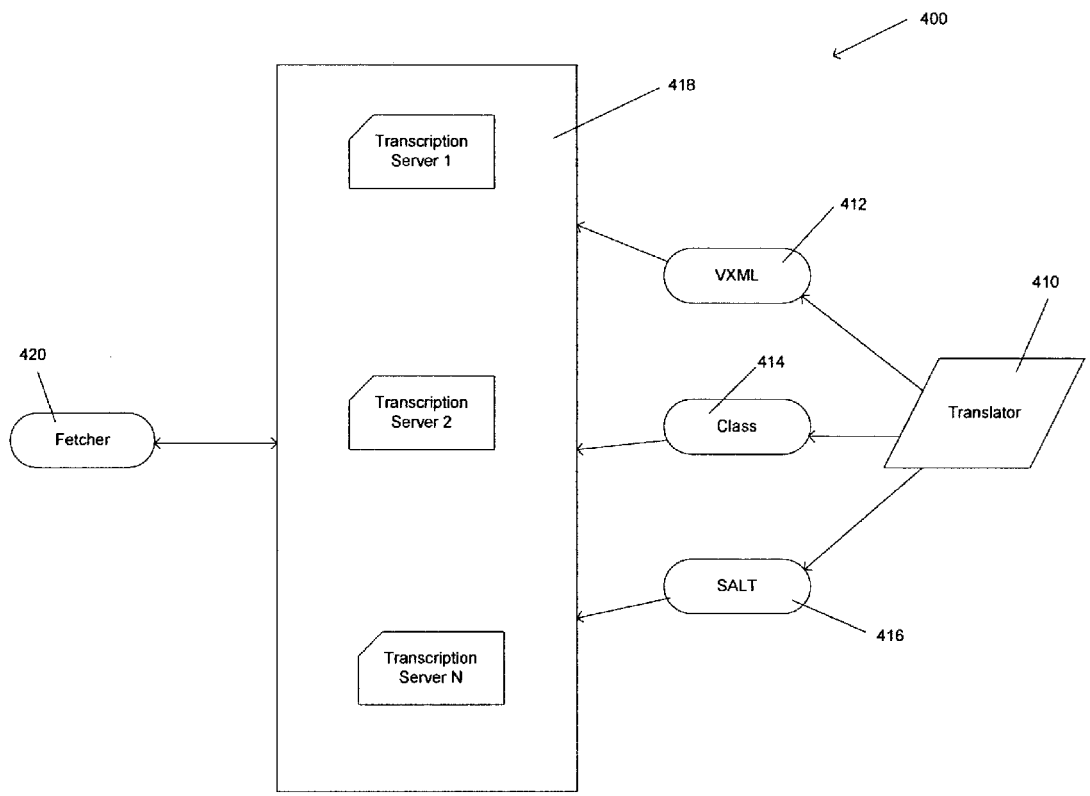
FIG. 4 represents an overview of fetcher activity management in accordance with an embodiment of the disclosure.

Referring now to FIG. 4, an overview of fetcher activity management 400 is depicted. A translator 410 uses automatic or natural speech recognition to translate an utterance, the data for which is uploaded in VXML 412, Class 414 or SALT 416 to a set of transcription servers 418 for transcription and tuning by transcriptionists. A fetcher 420 is used to store the utterance, translation and transcription and receive each set of the components in a correlated fashion for use by the transcriptionist. The transfer of information occurs via at least one of: a wireless protocol, a wired protocol and a combination of the wireless protocol and the wired protocol.

Figure 5:
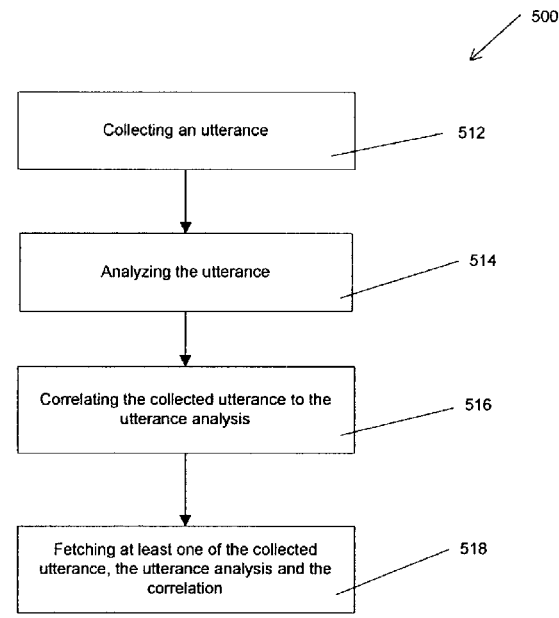
FIG. 5 represents a first method of automatic speech recognition tuning management in accordance with an embodiment of the disclosure.

Referring now to FIG. 5, a first method of automatic speech recognition tuning management 500 is depicted and comprises a number of blocks or modules that are software, hardware, or firmware, and/or the combination of software, hardware, and/or firmware. A method for automatic speech recognition tuning management that comprises, collecting 512 an utterance, analyzing 514 the utterance, correlating 516 the collected utterance to the utterance analysis, and fetching 518 at least one of, the collected utterance, the utterance analysis, and the correlation of the collected utterance to the utterance analysis. The transfer of information occurs via at least one of: a wireless protocol, a wired protocol and a combination of the wireless protocol and the wired protocol.

Figure 6:
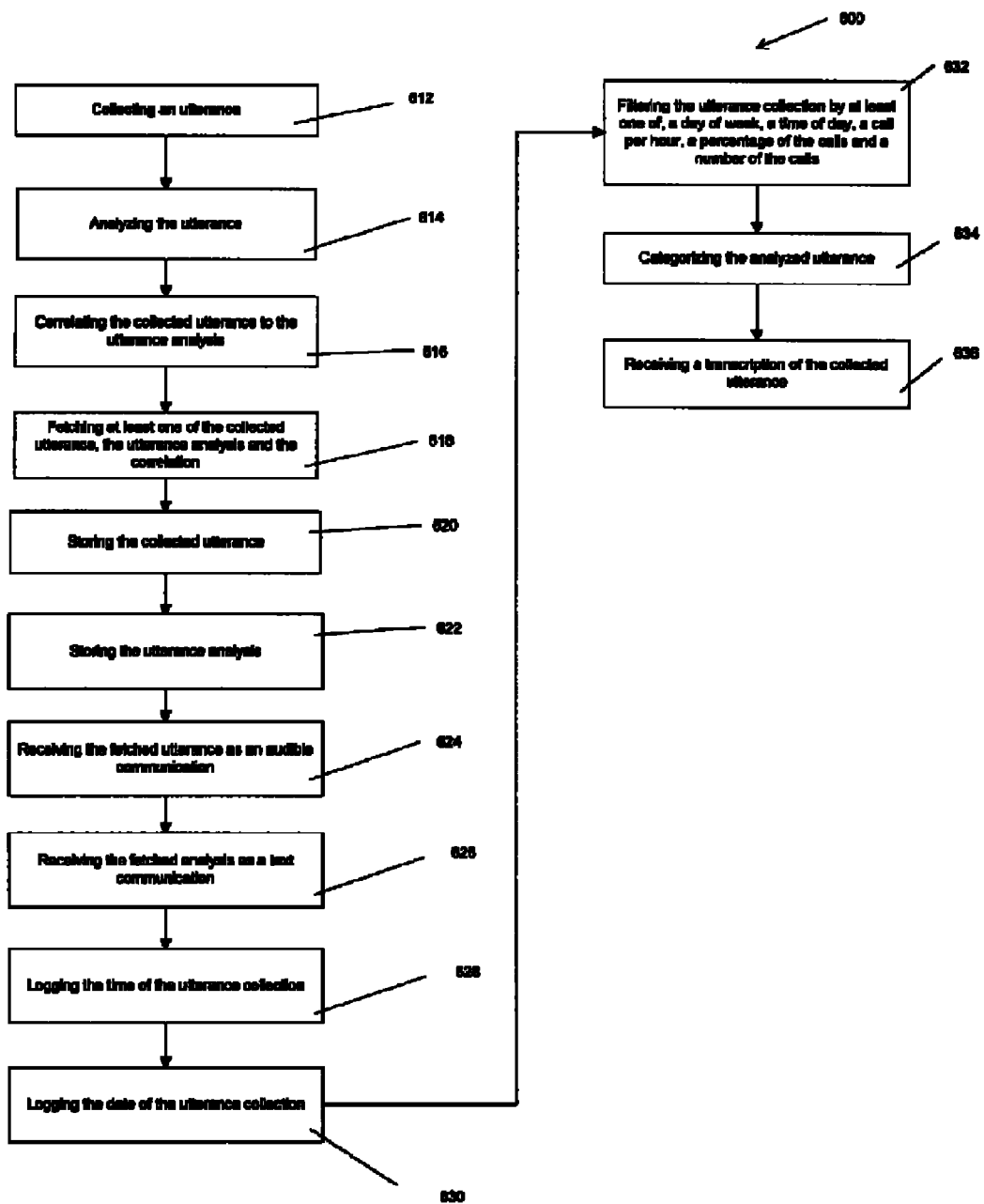
FIG. 6 represents a second method of automatic speech recognition tuning management in accordance with an embodiment of the disclosure.

Referring now to FIG. 6, a second method of automatic speech recognition tuning management 600 is depicted and comprises a number of blocks or modules that are software, hardware, or firmware, and/or the combination of software, hardware, and/or firmware. A method for automatic speech recognition tuning management that comprises, collecting 612 an utterance, analyzing 614 the utterance, correlating 616 the collected utterance to the utterance analysis, and fetching 618 at least one of, the collected utterance, the utterance analysis, and the correlation of the collected utterance to the utterance analysis. The method may comprise storing 620 the collected utterance, storing 622 the utterance analysis, receiving 624 the fetched utterance as an audible communication and receiving 626 the fetched analysis as a text communication. The method may additionally comprise logging 628 the time of the utterance collection and logging 630 the date of the utterance collection. The method may further comprise filtering 632 the utterance collection by at least one of, a day of week, a time of day, a call per hour, a percentage of the calls, and a number of the calls, categorizing 634 the analyzed utterance and receiving 636 a transcription of the collected utterance. The transfer of information occurs via at least one of: a wireless protocol, a wired protocol and a combination of the wireless protocol and the wired protocol.

Figure 7:
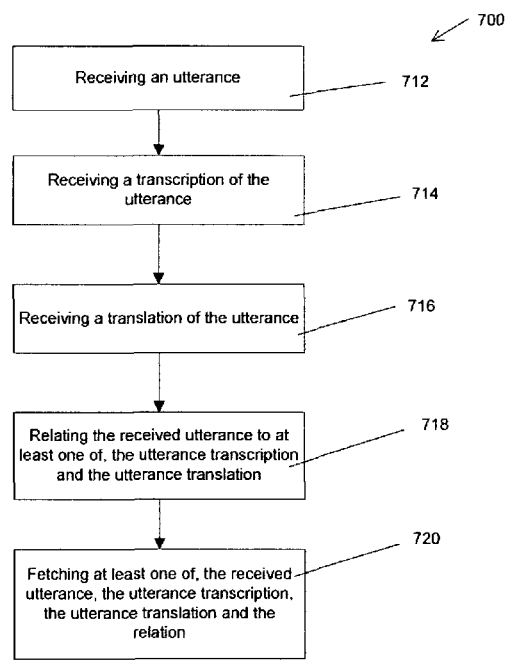
FIG. 7 represents a first computer readable medium in accordance with an embodiment of the disclosure.

Referring now to FIG. 7, a first software flow block 700 of automatic speech recognition tuning management is depicted. A computer readable medium that comprises instructions for, receiving 712 an utterance, receiving 714 a transcription of the utterance, receiving 716 a translation of the utterance, relating 718 the received utterance to at least one of, the utterance transcription, and the utterance translation, and fetching 720 at least one of, the received utterance, the utterance transcription, the utterance translation, and the relation. These steps are preferably embodied in a computer readable medium or software but may also be embodied in firmware and are utilized via hardware. The transfer of information occurs via at least one of a wireless protocol, a wired protocol and the combination of the wireless protocol and the wired protocol.

Figure 8:
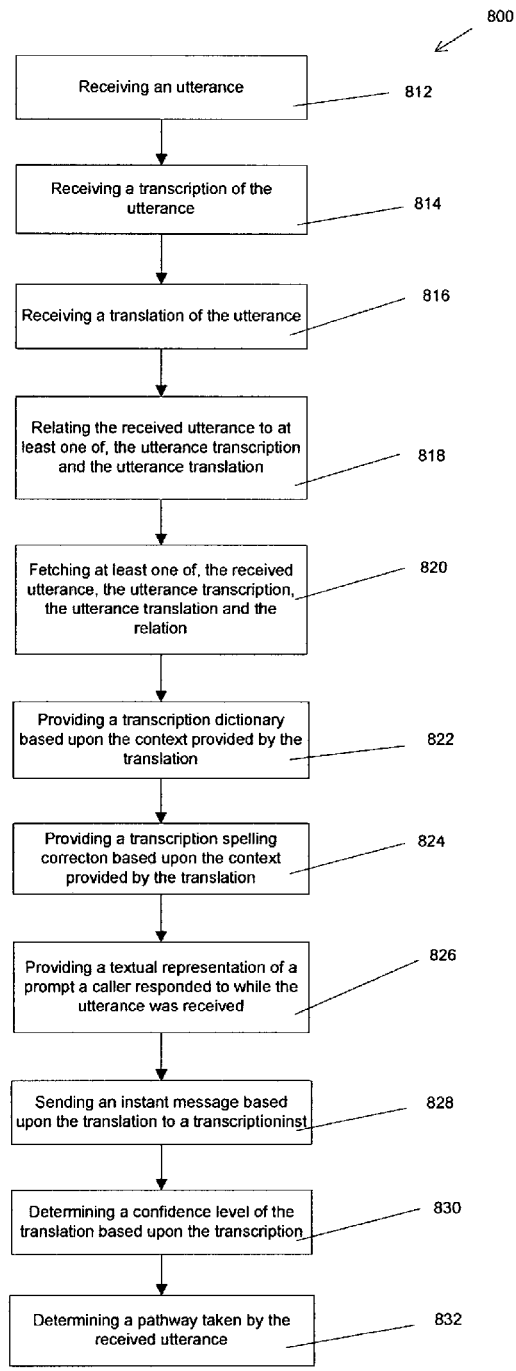
FIG. 8 represents a second computer readable medium in accordance with an embodiment of the disclosure.

Referring now to FIG. 8, a second software flow block 800 of automatic speech recognition tuning management is depicted. A computer readable medium that comprises instructions for, receiving 812 an utterance, receiving 814 a transcription of the utterance, receiving 816 a translation of the utterance, relating 818 the received utterance to at least one of, the utterance transcription, and the utterance translation, and fetching 820 at least one of, the received utterance, the utterance transcription, the utterance translation, and the relation. Wherein the receiving of the transcription is from a plurality of users and the translation is in at least one of the following formats, voice extensible markup language, class and speech application language tags. The computer readable media may comprise instructions for providing 822 a transcription dictionary based upon the context provided by the translation, providing 824 a transcription spelling correction based upon the context provided by the translation and providing 826 a textual representation of a prompt a caller responded to while the utterance was received. The computer readable medium may additionally comprise instructions for sending 828 an instant message based upon the translation to a transcriptionist, determining 830 a confidence level of the translation based upon the transcription and determining 832 a pathway taken by the received utterance. These steps are preferably embodied in a computer readable medium or software but may also be embodied in firmware and are utilized via hardware. The transfer of information occurs via at least one of a wireless protocol, a wired protocol and the combination of the wireless protocol and the wired protocol.

Figure 9:
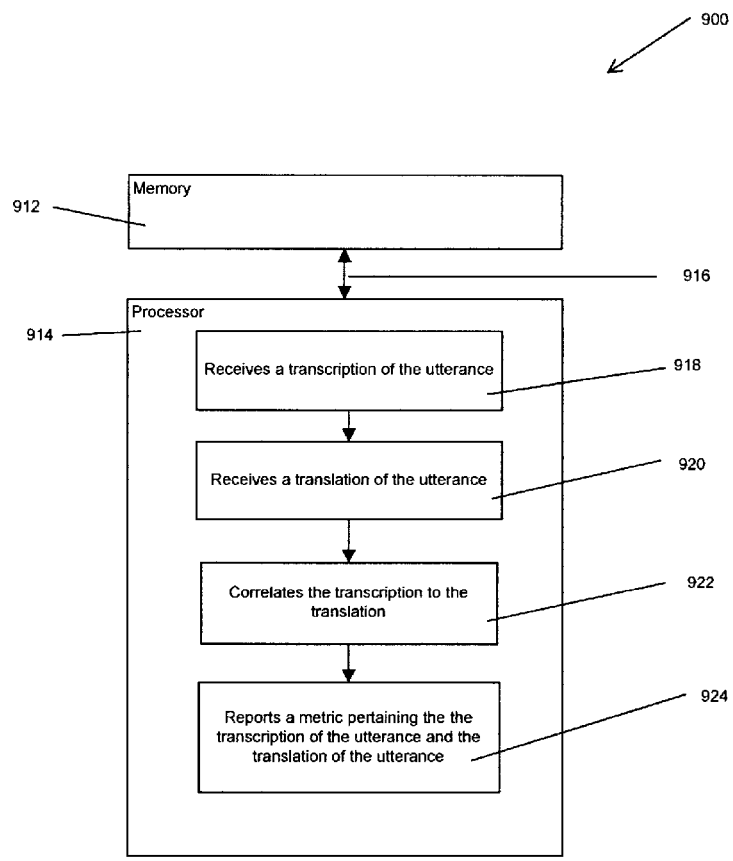
FIG. 9 represents a first system of reporting automatic speech recognition in accordance with an embodiment of the disclosure.

Referring now to FIG. 9, a system 900 of automatic speech recognition tuning management is depicted. A system for automatic speech recognition tuning management that comprises, a memory 912, and a processor 914 communicably coupled 916 to the memory, wherein the processor, receives 918 a transcription of an utterance, receives 920 a translation of the utterance, correlates 922 the transcription to the translation, and reports 924 a metric pertaining to the transcription of the utterance and the translation of the utterance. Wherein the reported metric includes at least one of, a transcription status, a transcription latency and a translation to transcription error The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware. Additionally, the processor and/or memory described herein form a circuit.

Systems, methods, devices and computer readable media have been shown and/or described in the above embodiments for automatic speech recognition tuning management. Although the above descriptions set forth preferred embodiments, it will be understood that there is no intent to limit the invention by such disclosure, but rather, it is intended to cover all modifications and alternate implementations falling within the spirit and scope of the invention. For example, the embodiment of the disclosure should not be limited to reporting automatic speech recognition. Lastly, the embodiments are intended to cover capabilities and concepts whether they be via a loosely coupled set of components or they be converged into one or more integrated components, devices, circuits, and/or software programs.

What is claimed is:

1. A method for automatic speech recognition tuning management comprising:
   collecting an utterance in a database;
   analyzing the utterance by a processor;
   providing at least one option to facilitate correct transcription of the utterance, wherein providing the at least one option comprises:
      providing a transcription dictionary based upon a context provided by a translation of the utterance; and
      providing a transcription spelling correction based upon the context provided by the translation of the utterance;
   correlating the collected utterance to the utterance analysis;
   correlating the transcription of the utterance to the translation of the utterance;
   reporting a metric pertaining to the transcription of the utterance and the translation of the utterance;
   providing at least two filters to create the transcription, the at least two filters include a simple filter and an advanced filter;
   wherein the simple filter is configured to turn the collecting on and off;
   wherein the advanced filter is configured to customize the collecting; and
   fetching, by the processor, at least one of:
      the collected utterance;
      the utterance analysis; and
      the correlation of the collected utterance to the utterance analysis.

2. The method of claim 1 comprising:
storing the collected utterance.

3. The method of claim 1 comprising:
storing the utterance analysis.

4. The method of claim 1 comprising:
receiving the fetched utterance as an audible communication.

5. The method of claim 1 comprising:
receiving the fetched analysis as a text communication.

6. The method of claim 1 comprising:
logging the time of the utterance collection.

7. The method of claim 1 comprising:
logging the date of the utterance collection.

8. The method of claim 1 comprising:
filtering the utterance collection by at least one of:
   a day of week;
   a time of day;
   a call per hour;
   a percentage of the calls; and
   a number of the calls.

9. The method of claim 1 comprising:
categorizing the analyzed utterance.

10. The method of claim 1 comprising:
receiving the transcription of the collected utterance.

11. A non-transitory computer readable storage medium comprising instructions for:
   receiving an utterance in a database;
   providing at least one option to facilitate correct transcription of the utterance, wherein providing the at least one option comprises:
      providing a transcription dictionary based upon a context provided by a translation of the utterance; and
      providing a transcription spelling correction based upon the context provided by the translation of the utterance;
   receiving the transcription of the utterance by a processor;
   receiving the translation of the utterance by the processor;
   relating the received utterance to at least one of:
      the utterance transcription; and
      the utterance translation;
   correlating the transcription of the utterance to the translation of the utterance;
   reporting a metric pertaining to the transcription of the utterance and the translation of the utterance;
   providing at least two filters to create the transcription, the at least two filters include a simple filter and an advanced filter;
   wherein the simple filter is configured to turn the receiving of the utterance on and off;
   wherein the advanced filter is configured to customize the receiving of the utterance; and
   fetching at least one of:
      the received utterance;
      the utterance transcription;
      the utterance translation; and
      the relation.

12. The non-transitory computer readable storage medium of claim 11 wherein:
the receiving of the transcription is from a plurality of users.

13. The non-transitory computer readable storage medium of claim 11 wherein:
the translation is in at least one of the following formats:
   voice extensible markup language;

class; and
speech application language tags.

14. The non-transitory computer readable storage medium of claim 11 comprising instructions for:
providing a textual representation of a prompt a caller responded to while the utterance was received.

15. The non-transitory computer readable storage medium of claim 11 comprising instructions for:
sending an instant message based upon the translation to a transcriptionist.

16. The non-transitory computer readable storage medium of claim 11 comprising instructions for:
determining a confidence level of the translation based upon the transcription.

17. The non-transitory computer readable storage medium of claim 11 comprising instructions for:
determining a pathway taken by the received utterance.

18. A system for automatic speech recognition tuning management comprising:
a memory; and
a processor communicably coupled to the memory, wherein the processor:
provides at least one option to facilitate correct transcription of an utterance, wherein providing the at least one option comprises:
providing a transcription dictionary based upon a context provided by a translation of the utterance; and
providing a transcription spelling correction based upon the context provided by the translation of the utterance;
receives the transcription of the utterance;
receives the translation of the utterance;
correlates the transcription to the translation;
provide at least two filters to create the transcription, the at least two filters include a simple filter and an advanced filter;
wherein the simple filter is configured to turn the transcription of the utterance on and off;
wherein the advanced filter is configure to customize the transcription of the utterance; and
reports a metric pertaining to the transcription of the utterance and the translation of the utterance.

* * * * *